United States Patent Office 3,333,646
Patented Aug. 1, 1967

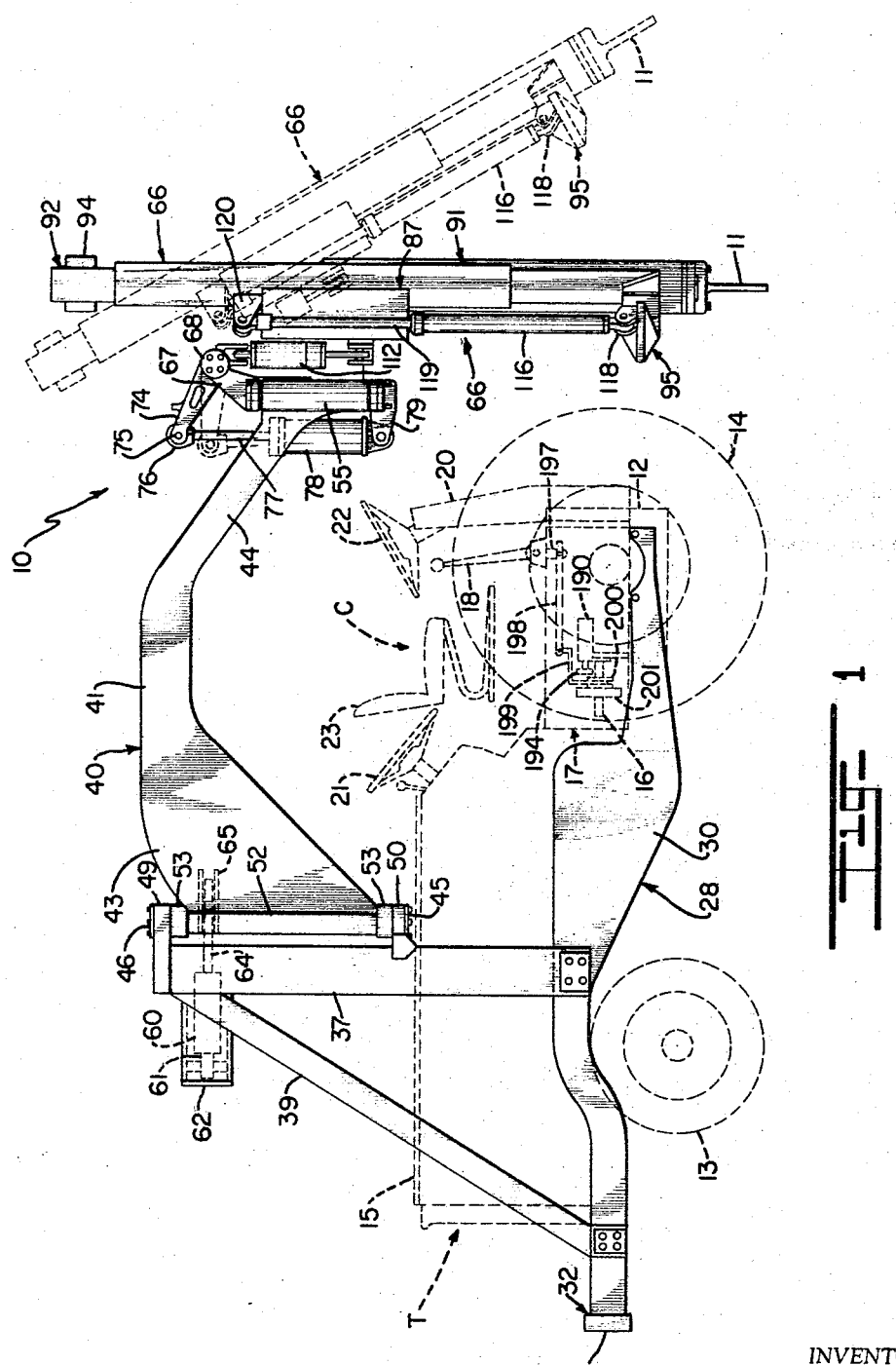

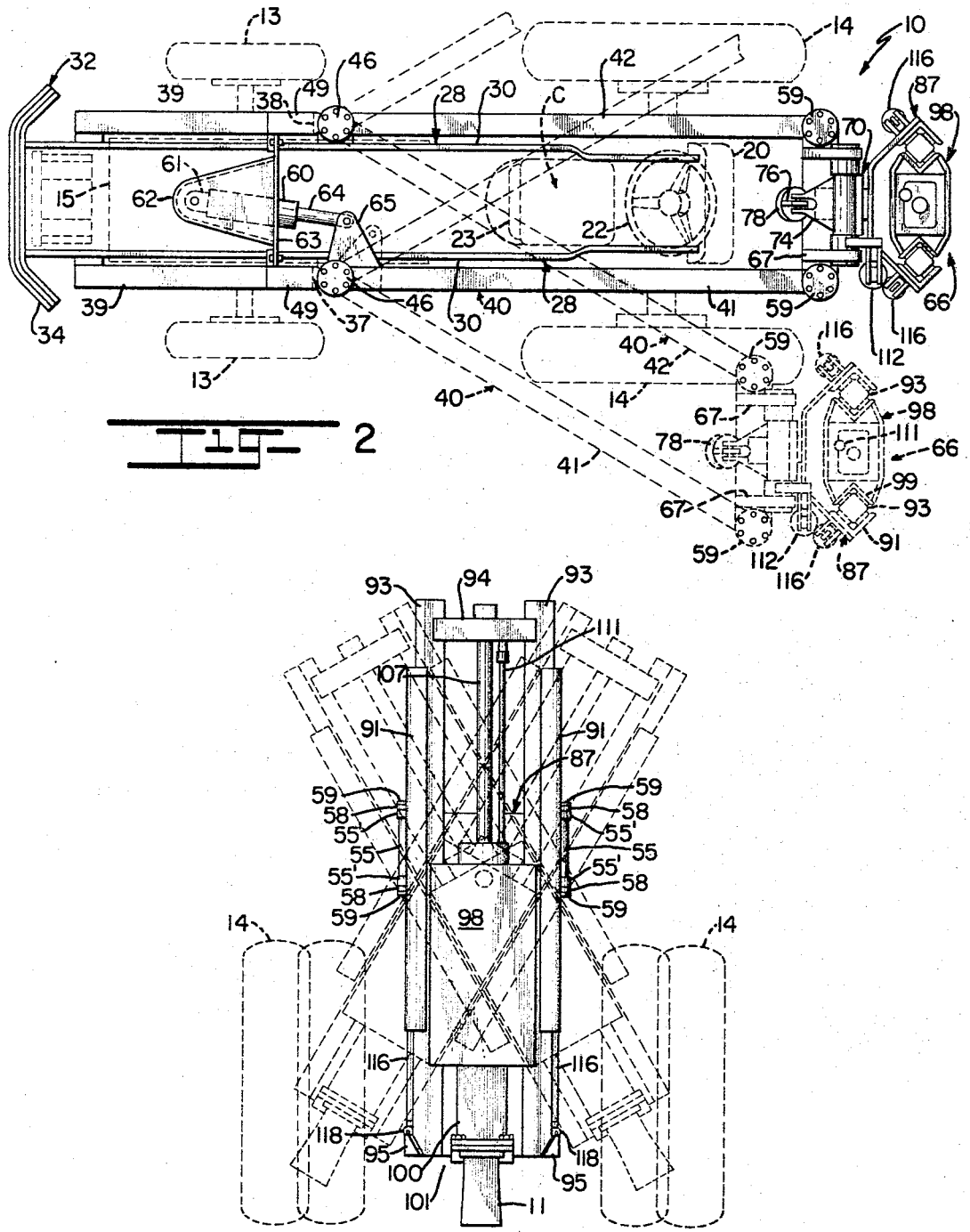

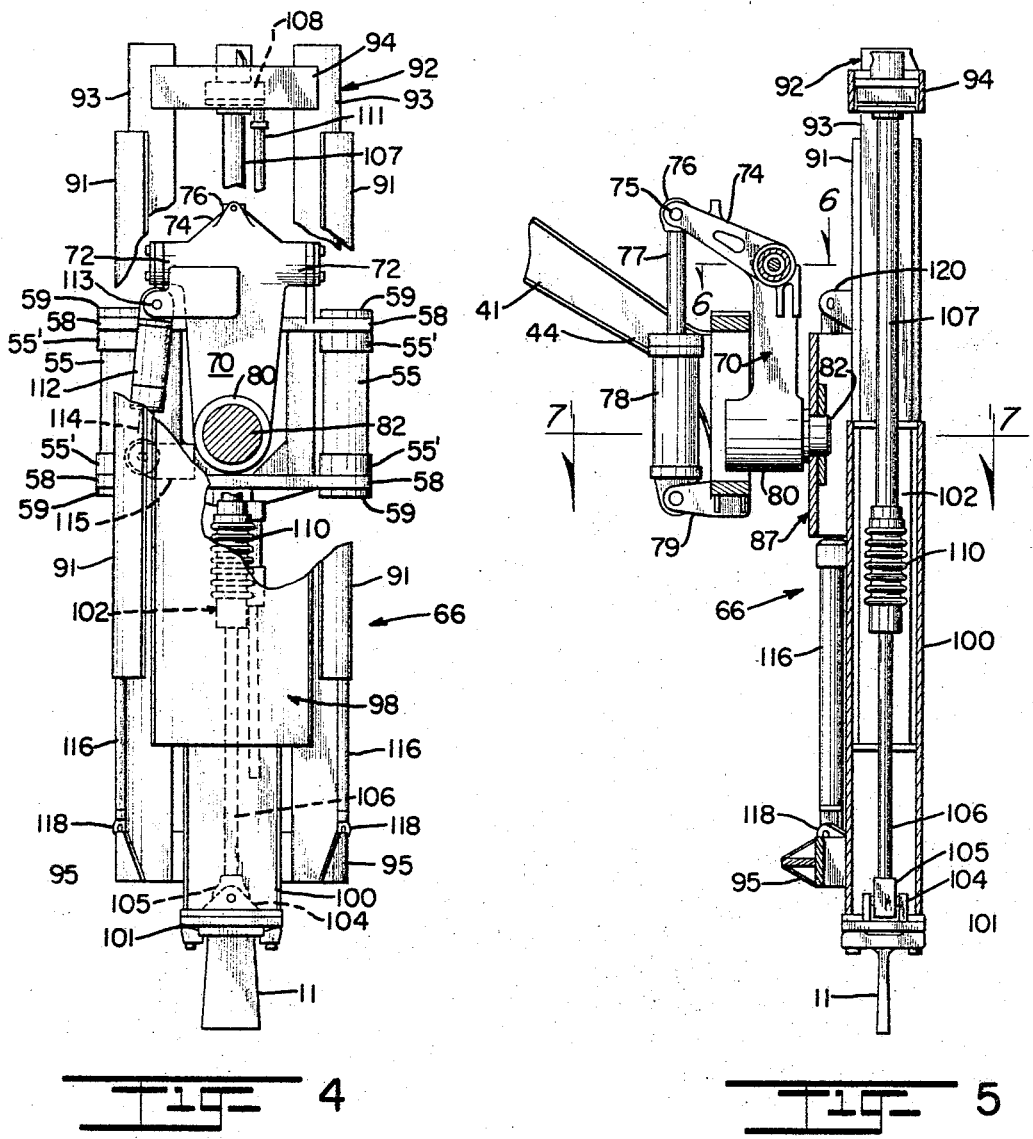

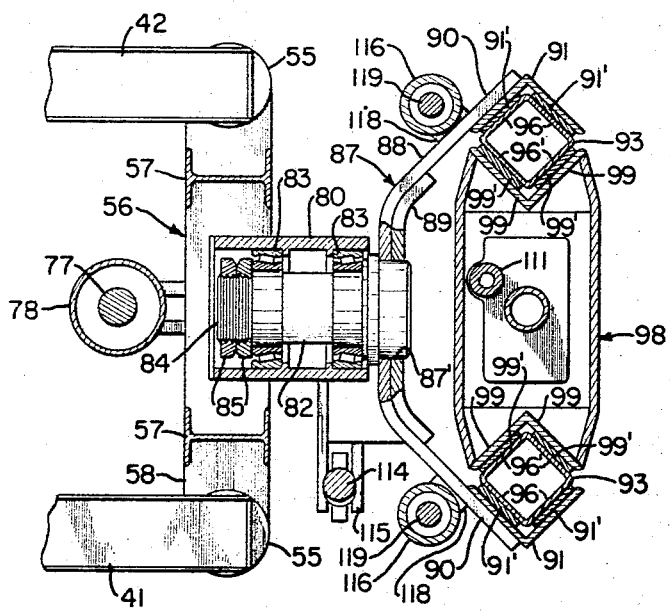
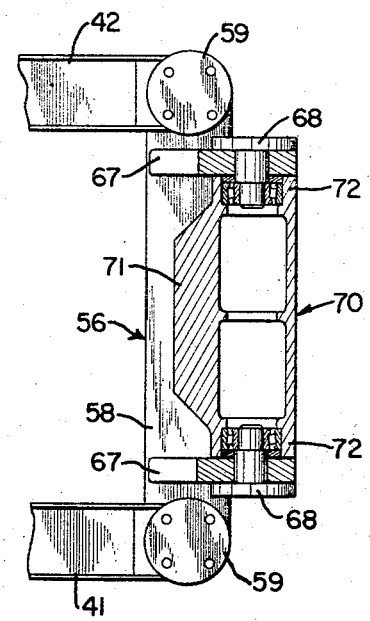
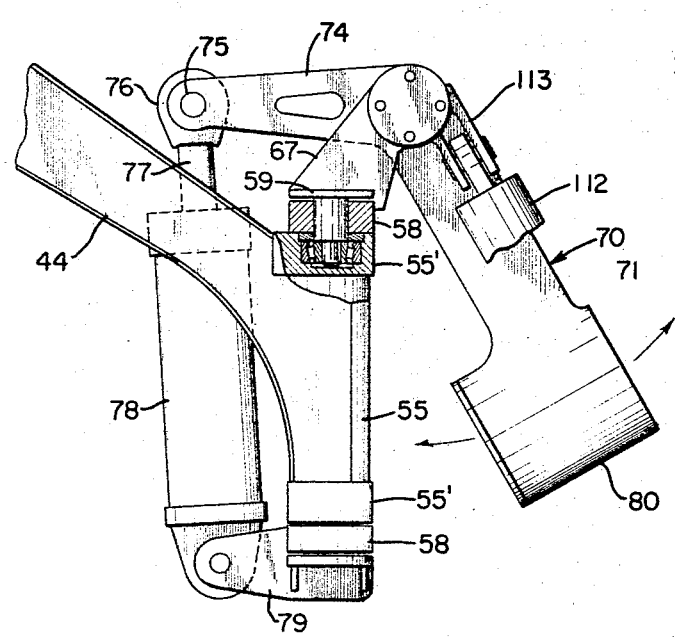
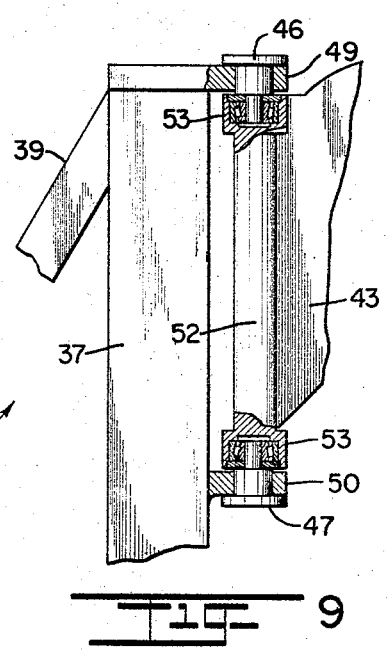

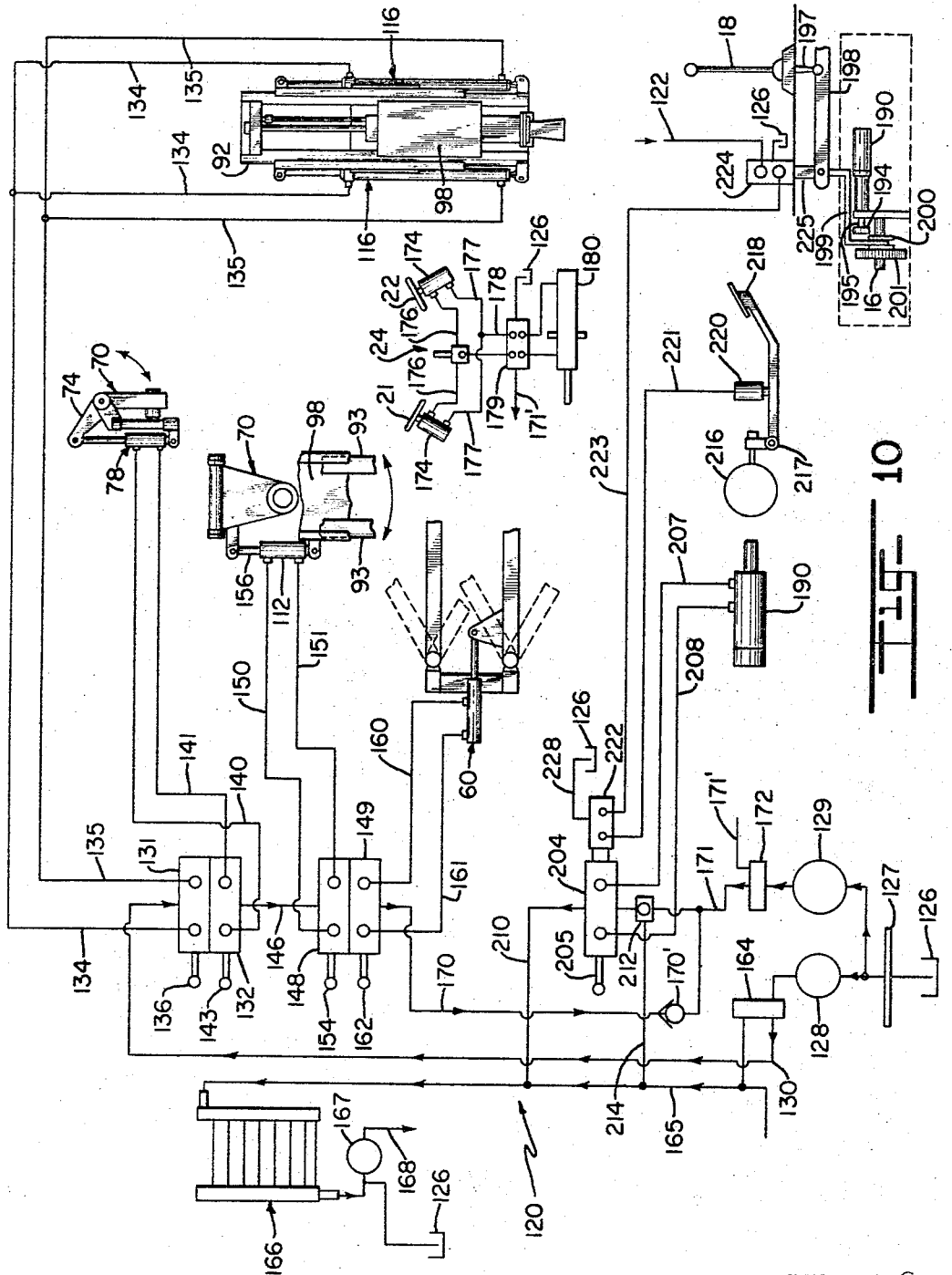

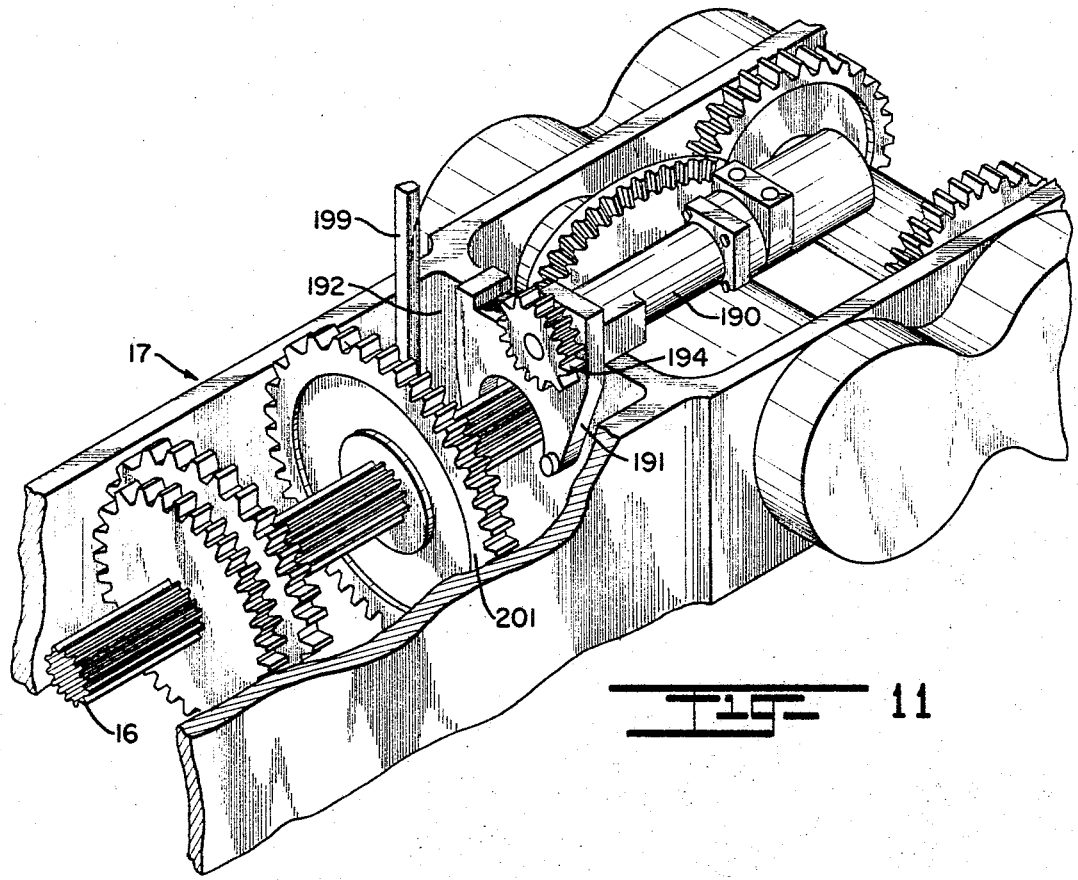
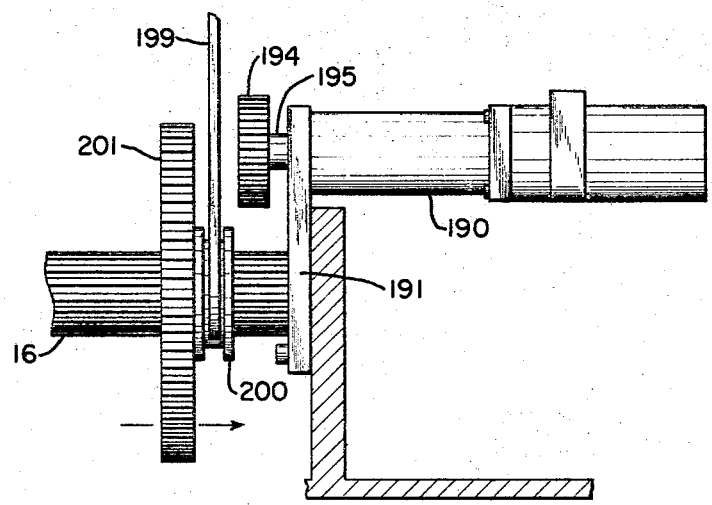

3,333,646
MOBILE HAMMER UNIT AND POSITION
CONTROL APPARATUS THEREFOR
Kenneth H. Hoen, 2396 Orchard Lane, Littleton, Colo. 80120; Walter J. Chapman, 1600 S. Columbine, Denver, Colo. 80206; and Robert W. Jones, 3775 S. Delaware, Englewood, Colo. 80110
Filed Nov. 18, 1964, Ser. No. 411,979
26 Claims. (Cl. 173—27)

This invention relates to a novel and improved tool support and control apparatus, and more particularly relates to hydraulically actuated control apparatus for supporting work tools or implements in operating position with respect to a vehicle under the direct control of the vehicle operator.

The apparatus of the present invention may be best exemplified by describing its use in association with vehicle-mounted, hydraulically actuated power hammers, since the supporting and control apparatus can be utilized to carry and to operate a number of implements or impact tools in performing different operations, such as for instance, tamping, backfill, scoring or breaking of concrete and other earth-working operations. Tools that are typical of the type referred to are set forth and described in copending application for patent for Hammer Tool Attachment and Tool, Ser. No. 345,006, filed Feb. 14, 1964, and assigned to the assignee of this invention, the tools customarily being attached to or suspended from the lower end of the hammer guide frame and reciprocated or otherwise powered to deliver a series of impacts or blows under considerable force to the surface being worked. To support different tools in performing various earth-working operations, it is of course highly desirable that each work tool be so positioned in relation to the vehicle and to the vehicle operator that the operator can closely follow the progress of the work and accurately control the movement of the tool into operating position. In this relation, it is also important that the tool supporting structure as well as the vehicle be capable of incremental movement throughout a wide range of different positions and specifically to traverse a wide sweep angle in relation to the vehicle, to tilt to the desired angle in any direction relative to the vehicle, and in addition to be vertically adjustable and movable to an out-of-the-way position when desired to advance the vehicle from one site to another.

Accordingly, it is an object of the present invention to provide for a novel and improved apparatus for supporting and operating work tools on a vehicle in the performance of a number of different earth-working operations; and to provide fluid-actuated controls for regulating the movement of the work tools in relation to the vehicle as well as for effecting creep or incremental movement of the vehicle in a novel and dependable manner.

It is another object of the present invention to provide new and useful means for mounting a work tool on a vehicle and the like and for controlling the movement of the work tool through a wide range of positions in relation to the vehicle and in such a way that the operator is able to closely follow the progress of the work in all positions of the tool.

It is another object of the present invention to provide for a novel and improved overhead boom construction for suspending work tools on a vehicle, and in association therewith to permit automatic and selective control of the movement of the tools by a single operator; and specifically to provide in such apparatus for hydraulic actuation of the tool into desired working position from a centralized location easily accessible to the operator.

It is a further object of the present invention to provide for a hydraulically-actuated, overhead position control apparatus to selectively control the movement and disposition of a work tool at one end of a vehicle for advancing the tool through a relatively wide sweep angle, tilting the tool to the desired angle, as well as for vertical adjustment and layback of the tool, and to do so in close unobstructed relation to the operator at all times.

It is a further object of the present invention to provide in a mobile, powered hammer machine for a new and improved apparatus for supporting, positioning and controlling the movement of impact tools and wherein such apparatus is characterized by its versatility and stability in use while permitting selective automatic control in the operation of the impact tools by a single operator.

It is an additional object of the present invention to provide in a mobile, powered hammer unit for an improved overhead boom structure for supporting the hammer guide frame for hammer tools and tool attachments in closely spaced relation to one end of the vehicle, and in such a way that the guide frame and tools may be advanced laterally of the vehicle over a relatively wide angle and in a line of travel approximating straight-line movement while maintaining the guide frame and tools squared to the line of travel of the vehicle; furthermore, to provide in association with said boom structure for an end support which will permit angulation of the guide frame and tools in the desired direction with respect to the boom structure and the vehicle.

The above and other objects, advantages and features of the present invention will become more readily understood and appreciated from a consideration of the following detailed description of a preferred form of the present invention taken together with the accompanying drawings, in which:

FIGURE 1 is a side elevational view of a preferred form of mobile hammer unit in accordance with the present invention;

FIGURE 2 is a top plan view of the hammer unit;

FIGURE 3 is a front elevational view of the hammer unit;

FIGURE 4 is an enlarged front elevational view of the hammer guide frame assembly for the hammer unit with portions broken away to illustrate the construction and arrangement thereof;

FIGURE 5 is an enlarged side elevational view, partially in section, of the hammer guide frame assembly;

FIGURE 6 is a sectional view taken on line 6—6 of FIGURE 5;

FIGURE 7 is a sectional view taken on line 7—7 of FIGURE 5;

FIGURE 8 is an enlarged fragmentary view, partially in section, showing the relative disposition and arrangement of parts between the hammer guide frame and boom assembly.

FIGURE 9 is an enlarged view of the bearing mount for the boom assembly;

FIGURE 10 is a diagrammatic view of a preferred form of hydraulic control circuit for the position control apparatus of the present invention.

FIGURE 11 is a somewhat perspective enlarged view with portions broken away of a "creeper" drive system for the preferred form of the present invention; and FIGURE 12 is a fragmentary side detailed view of the creeper drive in mounted relation on the vehicle.

Referring in detail to the drawings, there is illustrated in FIGURES 1 to 3 a preferred form of vehicle-mounted hydraulically-actuated power hammer which is broadly comprised of a position control apparatus 10 for a hammer tool 11 mounted on a tractor vehicle, represented in dotted form at T. For the purpose of illustration, the tractor shown in an International Harvester Corp. tractor Model No. I606 and conventionally includes a chassis 12, front wheels 13 and rear drive wheels 14. As broadly represented in FIGURE 1, the drive mechanism for the vehicle includes a front engine 15 and a transmission shaft 16 which is operated off of the engine crank shaft, not shown, and extends through a gear transmission and rear end differential housing 17 for driving the rear wheels 14 under the control of a shift control lever 18 in operator control section C. The control section C is situated toward the rear end of the vehicle and includes a rear cowling 20 mounted on the chassis 12 with front and rear steering wheels 21 and 22 and an operator seat 23 reversibly positioned therebetween so that the operator can face in either direction. In the forward position, the operator of course would drive the vehicle in a conventional manner; and in the rearward position, as shown, the operator may directionally control the vehicle together with the position control apparatus in performing different earthworking operations in a manner to be described. For this purpose, a dual control circuit 24 represented in FIGURE 11 is provided for operating and steering the vehicle in either position.

In accordance with the present invention, the position control apparatus 10 includes a fixed lower frame 28 mounted on the vehicle, and the frame consists of two elongated side frame members 30 attached to opposite sides of the chassis 12 and being interconnected by a plurality of spaced cross members including a front end bracket 32. The front end bracket 32 may also serve as a counterweight for the apparatus, the weight of which can be varied by adding or taking away one or more of a series of bumper plates 34. A pair of spaced vertical bearing posts 37 and 38 extend upwardly from the side members 30 at an intermediate point along the vehicle, and the bearing posts are reinforced by angular braces 39 in order to provide a rigid supporting structure for an overhead boom assembly 40. Essentially, the boom assembly consists of a pair of spaced, parallel support arms 41 and 42 in the form of cantilever beams having relatively wide pivot ends 43 converging rearwardly from the bearing posts in horizontal spaced relation over the operator control section, then curving downwardly and diverging outwardly into free terminal end portions 44. Of particular importance, the pivotal support ends 43 of the boom assembly are located away from the end of the vehicle thereby eliminating the need for supporting structure at the end of the vehicle and providing the operator with a close, unobstructed view of the work tool and ground surface. In addition, the tool 11 can be advanced along a relatively low sweep angle in close proximity to the end of the vehicle, and at the same time the pivotal ends 43 will counterbalance the weight of the tool and tool supporting structure at the end of the vehicle.

As shown in detail in FIGURE 9, the boom support arms 41 and 42 are preferably supported for lateral swinging movement about the bearing posts 37 and 38 by upper and lower end roller bearing assemblies 46 and 47 mounted on spaced upper and lower end brackets 49 and 50, respectively, extending horizontally from each bearing post. Each pivotal end 43 has an end column 52 with opposed socket end portions 53 for insertion of the roller bearings in order to support the boom arms for lateral movement about vertical axes through the bearing assemblies. As shown in FIGURES 7 and 8, the outer free ends 44 of the cantilever support arms 41 and 42 terminate in vertical columns 55 that are pivotally interconnected by a rigid end frame 56, the latter also defining a pivot mount for the hammer guide frame assembly in a manner to be described. The end frame 56 is dimensioned to interconnect the columns 55 and support arms in spaced parallel relation to one another while being free to swing laterally in a horizontal plane over the operator control section. To this end, the end frame 56 is of generally rectangular or box-shaped construction and consists of a pair of spaced, vertical I-beams 57 interconnected by top and bottom horizontal cross plates 58. Roller bearings 59 are mounted at opposite ends of the cross plates 58, and upper and lower bearing pairs are inserted in sockets 55' at opposite ends of the columns 55 so as to pivotally support the vertical columns 55 on opposite sides of the end frame.

Lateral swinging movement of the entire boom assembly about the vertical bearing posts is controlled preferably by means of a double-acting cylinder 60 having cylinder end 61 pivotally attached to the end of a mounting bracket 62 on a cross brace 63; and piston 64, movable in cylinder 60, is pivotally connected to a mounting bracket 65 on the cantilever support arm 41. Thus it will be evident that movement of the piston outwardly from the cylinder will cause movement of the support arm 41 to the right, as shown in FIGURE 2, and due to the manner of pivotal interconnection between the free ends 44, the support arm 42 will follow the movement of arm 41. It will be noted further that the end frame 56 remains squared or normal to the line of travel of the vehicle notwithstanding angular swinging movement of the support arms, again as best seen from FIGURE 2, as a result of which the hammer tool 11 will correspondingly remain squared to the line of travel under swinging movement of the boom assembly.

From the foregoing, it will be apparent that various implements may be movably mounted at the free end of the boom assembly 40 for lateral movement across the rear end of the vehicle. In the preferred form, the boom assembly is utilized to support a hammer guide frame assembly 66 shown in detail in FIGURES 4, 5 and 7 for operation of the hammer tool 11; and for this purpose the end frame or pivot mount is provided with a pair of horizontally spaced, upper layback mounting brackets 67, as shown in FIGURE 6, projecting upwardly and rearwardly from the top cross plate member 58. The brackets 67 define end supports for a pair of roller bearing assemblies 68 for journaled connection and support of a cradle 70. The cradle 70 is formed of a body portion 71 having horizontal aligned, upper socket end portions 72 adapted to receive the opposed roller bearings 68 therein. In addition, pivoting of the cradle about the horizontal bearing axis is controlled by means of a forwardly extending pivot arm 74 having its forward end 75 pivotally connected to a yoke 76 at the upper end of a piston 77 movable in a double-acting cylinder 78. The cylinder 78 has its lower end pivotally connected to brackets 79 at the lower end of the end frame 56, in which relation the power cylinder 78 is free to vary its angular disposition in controlling up and down movement of the pivot arm 74 and resultant movement of the cradle 70 between a vertical and outward inclined position, independently of lateral movement of the boom assembly. Accordingly, the hammer frame assembly may be adjusted to a predetermined angle of inclination with respect to the vehicle and ground and can be further advanced to approach a horizontal layback position above the boom assembly either for performing work in this position or in driving the vehicle from one site to another.

In order to mount the hammer frame assembly 66 for tilting or rotational movement, the cradle 70 additionally includes a cylindrical housing 80 disposed in the lower end of the body on an axis parallel to the longitudinal axis of the vehicle and perpendicular to the upper horizontal bearing axis between the cradle and pivot mount. The housing 80 is dimensioned to receive a spindle or enlarged support pin 82 on the hammer frame assembly 66 for journaled connection with a pair of spaced bearings 83 within the housing; and the spindle has an inner threaded end 84 with lock nuts 85 to lock the spindle against axial displacement while permitting rotational movement with respect to the cradle and boom assembly in the manner illustrated in FIGURES 3 and 7.

In the hammer frame assembly, a hammer weldment 87 defines the principal means of support and is made up of a main gusset plate 88 and a reinforcing plate 89, both of heavy-walled construction, with the support pin 82 fixedly mounted within a central opening 87' on the weldment. As shown in FIGURE 7, the gusset plate 88 is formed with vertical rearwardly divergent sides 90; and vertically aligned, generally V-shaped guideways 91 are permanently attached along the inner terminal end surfaces of the sides 90 in facing relation to one another for the purpose of guiding the vertical movement of a tower structure 92. The tower includes a pair of elongated side track members 93 connected in spaced parallel relation by a top cross brace 94 and a bottom cross brace 95 so as to define a rigid unitary structure. It will be seen that the track members are vertically aligned for sliding movement within the guideways, and to this end each track is generally rectangular in cross-section with two outer adjacent sides 96 disposed for sliding movement along bearing portions 91' attached to the inner surfaces of the guideway; and the two inner adjacent sides 96' on each of the track members also form guideways for independent vertical sliding movement of a hammer head 98 therealong. In this relation, the bottom cross brace 95 is offset somewhat, as shown in FIGURES 1 and 5, to afford sufficient clearance space for vertical movement of the hammer head between the lower ends of the track members.

The hammer head 98 is of hollow heavy-walled construction and includes vertical side walls 99 forming generally V-shaped vertical grooves with bearing portions 99' along the grooves for the inner contacting side surfaces 96' of the track members. The bottom of the hammer head has a reduced hollow rectangular extension 100 with an adaptor 101 at its lower end for attachment of the hammer tool 11. Here, the hammer head is constructed to impart vertical downward movement to the tool under considerable force, the hammer head being controlled in movement by means of a hydraulically actuated ram cylinder assembly 102. In order to pivotally attach the arm cylinder assembly 102 to the head, a pair of spaced upwardly directed gusset plates 104 are mounted within the lower end of the reduced extension for connection with a yoke 105 on piston rod 106. In turn, the ram cylinder 107 is connected at its upper end through a knuckle joint 108 to the cross brace 94 at the top of the tower structure. Preferably, the ram cylinder assembly is double acting to control up and down travel of the hammer head and tool, and a ram cylinder construction and hydraulic hammer control circuit suited for this purpose is shown and described in more detail in copending application Ser. No. 411,978, filed Nov. 18, 1964, and assigned to the assignee of this invention. Broadly, however, the lower end of the cylinder is secured within a reinforcing sleeve 110, suspended within the hammer head, and the piston rod 106 extends downwardly through the reduced extension for pivotal connection with the gusset plates. When fluid is applied under pressure through suitable pressure lines, not shown, to the upper end of the ram cylinder, it will force the piston downwardly to impart a downstroke to the hammer head and attached tool structure and to cause the hammer head to travel along the inner track bearing surfaces. Conversely, fluid delivered under pressure to the lower end of the cylinder will force the piston and attached hammer head upwardly to its initial position. A trip cylinder represented at 111 may be suitably positioned alongside the ram cylinder assembly to control the length of stroke, again as described in our copending application.

Tilting movement of the hammer guide frame assembly about the cradle 70 is controlled by a hydraulic cylinder 112 pivotally attached to mounting brackets 112 extending downwardly from the pivot mount 56. A double acting piston 114 is movable through the cylinder and extends downwardly for pivotal connection between mounting brackets 115 at one side of the hammer weldment. It will be seen that fluid applied under pressure to either end of the cylinder 112 will cause rotation of the entire hammer frame assembly, either in a clockwise or counterclockwise direction, about the spindle 82 in the housing 80 to tilt the hammer tool in a plane transverse to the vehicle and boom assembly.

As hereinbefore described, the tower structure 92 has a pair of side track members 93 which are slidable in the outer guideways 91, while acting as guide tracks for independent sliding movement of the hammer head 98. The tower and attached hammer head may be raised or lowered in relation to the outer guideways 91 by a pair of vertical lift members, each being in the form of a double-acting cylinder 116 pivotally attached at its lower end to a pair of spaced mounting brackets 118 on either side of the lower cross brace 95 and having a piston rod 119 extending upwardly for pivotal connection to spaced mounting brackets 120 on the outer surface of the stationary hammer weldment. The piston remains stationary so that fluid delivered under pressure to the upper ends of the cylinders will raise the cylinders, tower and hammer head upwardly in relation to the hammer weldment; or, fluid delivered to the lower ends will correspondingly lower the cylinders and tower, and accordingly the cylinders may be actuated in either direction to initially position the hammer tool 11 at the desired level in relation to the ground surface prior to actuation of the ram cylinder assembly. The lift cylinders 116 may act also as shock recoil members to absorb shocks imparted to the hammer frame assembly by the hammer tool when operated by the ram cylinder assembly.

Referring to FIGURE 10, the various position control cylinders for the boom assembly and hammer frame assembly are preferably controlled through a common hydraulic control circuit, generally represented at 120, whereas the ram cylinder assembly is actuated by a separate hammer control circuit, not shown, through suitable pressure lines leading to the upper and lower ends of the cylinder 107, again as set forth in copending application Ser. No. 411,978.

In the position control circuit 120, a source of hydraulic fluid is provided by a fluid supply tank 126, including a filtered outlet 127, which communicates with a low volume pump 128 and a high volume pump 129 connected in parallel in the circuit. The low volume pump 128 delivers fluid under pressure through line 130 to parallel connected lift control valve 131 and layback control valve 132, each valve suitably being of the type known as a four-way, open center valve with a center hold position. The valve 131 communicates through lines 134 and 135 with the upper and lower ends of each of the lift cylinders 116 on opposite sides of the tower structure. A manual control lever 136 controls movement of the valve body or spool whereupon movement in one direction will supply fluid under pressure from the line 130 through line 134 to the upper ends of the cylinders 116 thereby raising th tower structure 92 and hammer head 98; or by moving the lever 136 in the opposite direction will supply fluid under pressure through lines 135 to the lower ends of the cylinders 116 to lower the tower structure and hammer head.

The layback control valve 132 has lines 140 and 141 communicating with opposeite ends of the double-acting cylinder 78. By manipulation of the control lever 143, fluid supplied under pressure through line 140 will lower the pivot arm 74 to raise the cradle 70 and attached hammer frame assembly 66; whereas, fluid supplied under pressure through the line 141 will raise the pivot arm 74 and lower the hammer guide frame assembly. Since the valves 131 and 132 are connected in parallel, fluid displaced from the layback or lift cylinder and returned through its respective control valve is discharged into common discharge line 146. Moreover, the valves 131 and 132 may be actuated simultaneously or independently to control movement of the lift cylinders and of the layback control piston; but under simultaneous actuation, fluid under pressure through line 130 will follow the path of least resistance so that the lift cylinders if under less resistance may be actuated ahead of the layback cylinder. Then, as fluid pressure again builds up, sufficient pressure will be applied through valve 132 to actuate the layback control cylinder 78. Essentially, therefore, the hammer head and tool may be raised while inclining the entire hammer guide frame assembly about the pivot mount into the horizontal layback position over the boom assembly.

The control valves 131 and 132 exhaust through the discharge line 146 to a side tilt control valve 148 and a side travel control valve 149, also connected in parallel, and again being four-way open center valves with center hold positions. The side tilt control valve 148 has lines 150 and 151 in communication with opposite ends of the tilt control cylinder 112 for the hammer frame assembly, and through manual control lever 154 the valve 148 will control the supply of fluid to either end of the cylinder 112 for rotation of the entire hammer frame assembly 66 in the desired direction about the cradle and boom assembly, independently of actuation of the other position control cylinders.

The side travel control valve 149 has delivery lines 160 and 161 communicating with opposite ends of the double-acting power cylinder 60 in order to control lateral swinging movement of the boom assembly, again by movement of a control lever 162 for the valve. The valves 148 and 149, being connected in parallel, similarly may be actuated independently or simultaneously to effect both rotational movement of the hammer frame assembly and side travel movement of the entire boom assembly and hammer frame to advance the hammer tool into desired relation to the work surface. Moreover, the bank of control valves 131–132 and 148–149 may be connected in series as shown to permit simultaneous or indepedent actuation of the various position control cylinders. In this relation, the position control valves are connected as described for the convenience of the operator taking into consideration the demand placed on the fluid supply source by the equipment. A system relief valve 164 is suitably connected in the supply line 130 to remove excess fluid through exhaust line 165 leading to an oil cooler 166. From the oil cooler the fluid is returned to tank 126 which may serve as a common source of fluid supply, through pump 167 and line 168 for the hammer control circuit. Fluid discharged from the control valves 148 and 149 are removed through common discharge line 170, having check valve 170, into pressure line 171 leading from the outlet side of a flow divider 172 to a creeper drive control circuit.

As represented in FIGURE 10, the flow divider proportions fluid flow from the pump 129 through line 171 to the creeper drive control circuit to be described, or through line 171' to supply fluid to steering circuit, the latter including dual controls for wheels 21 and 22 on the vehicle. Thus, the steering circuit includes a pair of steering wheel pumps 174 controlled in operation by a common manual control valve 175 between pressure lines 176 leading to each pump. Return lines 177 from each pump are connected through a common line 178 to a pilot control valve 179 for a steering wheel control cylinder 180. The pilot valve 179 communicates through line 171' with the flow divider 172, the flow divider being designed to proportion flow from the high volume pump 129 such that the power steering mechanism will have priority on fluid supplied from the high volume pump 129 and power steering is always available in controlling the vehicle. In the power steering circuit, by manually setting the control valve 175, fluid under pressure is selectively applied through the steering cylinder 180 to either of the pumps 174 for power steering through one of the steering wheels 21 and 22 by suitable regulation of the control valve 175.

In order to provide for close positional control of the tractor and attached work tool, a creeper drive unit is coupled in a unique manner to the drive mechanism for the vehicle, and under the control of the operator will cause incremental movement of the vehicle either in the forward or reverse direction at a reduced rate of speed. Preferably, the creeper drive also includes a brake interlock which is correlated with the creeper drive to automatically brake the vehicle when the creeper drive is not actuated. Referring to FIGURES 10 to 12, the preferred form of creeper drive is comprised of a creeper drive motor 190 secured by means of mounting bracket 191 to a cross member or web 192 in the transmission and differential housing 17. Preferably, the drive motor is a hydraulically actuated, reversible motor, such as the Model No. AK3 orbit motor manufactured by the Charlynn Company, and has pinion 194 disposed on motor drive shaft 195 in spaced, parallel relation to the vehicle drive shaft 16 leading into the transmission housing. As represented in FIGURE 10, the gear shift lever 18 in the operator control section C has a pivot link 197 connected to a shift rail 198. Projecting downwardly from the shift rail is a shifting fork 199 which makes engagement with a collar 200 mounted on one side of a reduction gear 201 splined to the drive shaft 16. The reduction gear may be an extra gear mounted on the shaft 16 or, in the model 1606 tractor, the reverse gear may be utilized as the reduction gear since a separate shuttle transmission for reverse movement is provided in the vehicle. To reach the creeper drive position, the shift lever 18 is first shifted through "neutral" so that the vehicle is in neutral when the creeper drive is actuated to drive the vehicle; and by shifting the lever 18, the shifting fork 199 will shift the gear 201 rearwardly along the shaft into intermeshing engagement with the pinion 194 to drive the transmission and differential off the creeper drive motor 190.

In order to control actuation of the creeper drive motor 190, a control valve 204 is positioned in the high volume line 171 from pump 129. The control valve may be a four way open center spool valve with a manual control lever 205 normally biased to the center position. Thus when the control lever 205 is shifted either in a forward or reverse direction it will deliver fluid under pressure either through line 207 or 208 to the drive motor 190 in either direction. Upon release, the lever 205 will return to the neutral center position whereupon fluid flow is blocked to the drive motor 190, and the fluid from line 171 is then discharged through line 210 to the main exhaust line 165 leading to oil cooler 166. To regulate the speed of rotation of the drive motor a manual flow control valve 212 is positioned in the line 171 ahead of the control valve 204 with line 214 discharging into the exhaust line 165.

In accordance with the present invention, the brake interlock for the creeper drive is arranged to be incorporated in the conventional brake assembly furnished with the tractor vehicle. As represented in FIGURE 10 and for the purpose of illustration, the conventional brake assembly for each wheel may suitably consist of a disk-type brake drum 216 actuated through linkage 217 by a foot control pedal 218 accessible to the operator in the operator control section C. In turn, the brake interlock consists of a hydraulic brake cylinder 220 actuated through line 221 by a brake control valve 222, the latter valve being mechanically linked to the creeper drive control valve 204. The valve 222 receives fluid under pressure from a pressure supply line 223 connected to a suitable fluid supply source, not shown, but which is represented as being in the hammer control circuit. In order to deenergize the brake interlock when the creeper drive is not in use, a control valve 224 is positioned in line 223 and which is normally closed to block fluid pressure from the hammer control circuit. Suitably, the control valve 224 may be a three-way valve, including a discharge line to the tank and a control member 225 to selectively open and close the line 223. Preferably, the member 225 is actuated by movement of the gear shift lever 18 into the creepr drive position; or in other words, when the shift rail 198 is shifted to interengage the pinion and reduction gear the member 225 is simultaneously actuated out of slot 226 by the shift rail to move the valve to an open position admitting fluid through line 223 to the brake control valve 222.

In use, the gear shift lever 18 is first advanced to the creeper position as described to shift the reduction gear into engagement with the pinion and to open the brake interlock control valve 224. Since the creeper control valve is normally in a closed, neutral position, brake cylinder control valve 222 is open to supply fluid under pressure to the brake cylinder to lock the brake system and vehicle. When the creeper control valve lever is moved in either the forward or reverse direction it will simultaneously actuate the spool valve 222 to a closed position blocking fluid flow from the line 223 and releasing fluid from the brake cylinder through return line 228 to the tank 126, thereby releasing the brake for movement of the vehicle under control of the creeper drive. At the same time, the control valve is advanced to a position supplying fluid under pressure either through line 215 or 216, depending on the direction of movement of the control lever 205, for forward or reverse drive of the pinion and reduction gear. Each time that the control lever 205 is released, the creeper control valve 204 will return to the closed, neutral position causing the brake control valve 222 to open and to brake the vehicle against movement. In the creeper drive position the vehicle may therefore be advanced or reversed incrementally for the desired distance, then is automatically braked in position for operation of the position control apparatus and hammer tool; and through the combined utilization of the creeper drive, power steering and position control circuitry, the hammer tool may be maneuvered rapidly and effectively into virtually any position.

From the foregoing, a vastly improved position control apparatus has been devised including a position control circuit and creeper drive system for controlling movement of the hammer tool or other implement mounted on the boom assembly as well as incremental movement of the vehicle and attached tool structure. The control levers for the various position control cylinders may be suitably located in the operator control section so as to be easily accessible to the operator; and, due to the unique manner of supporting and positioning the tool structure on the vehicle, it is possible for the operator to closely and accurately control operation of the tool and to view the work in progress. Furthermore, the hollow elongated construction of the hammer head and its disposition in relation to the tower structure results in a more compact hammer structure without sacrificing length of stroke, since the ram cylinder assembly may extend through the hollow interior of the head; and relatively long guide surfaces are permitted along opposite sides of the hammer head thereby minimizing any tendency of the hammer to drift.

It is therefore to be understood that while there has been illustrated and described one preferred embodiment of the present invention as utilized in association with a hydraulically actuated hammer unit, various modifications and changes may be resorted to in the construction and arrangement of elements, as well as their application to different uses, without departing from the spirit and scope of the invention, as defined by the appended claims and reasonable equivalents thereof.

What is claimed is:

1. Position control apparatus comprising in combination with a vehicle having a chassis and an operator control section adjacent to one end thereof, a fixed mounting frame on said chassis including boom supporting means thereon, a boom member having one end mounted on said boom supporting means for horizontal extension over the operator control section, said boom member terminating in a free end portion outwardly of the one end of the vehicle adjacent to the operator control section, and an implement mounted on the free end portion of said boom member.

2. Position control apparatus comprising in combination with a vehicle having a chassis, a drive mechanism and an operator control section adjacent to one end of the vehicle, a fixed mounting frame including upright boom supporting means disposed on the chassis with the operator control section being situated between said boom supporting means and the one end of said vehicle, an overhead boom member having one end pivotally mounted on said boom supporting means for horizontal extension of said boom member in spaced relation over the operator control secton, an implement suspended at the free end portion of said boom member, and means operatively connected to said boom member to effect lateral movement of the free end portion of said boom member in relation to the vehicle.

3. Position control apparatus according to claim 2, said boom member being defined by a cantilever support arm terminating in a downwardly extending free end portion outwardly of the one end of the vehicle.

4. Position control apparatus comprising in combination with a vehicle having a chassis and an operator control section reversibly positioned adjacent to the rear end of the vehicle, a fixed mounting frame on said chassis including upright boom supporting means extending upwardly from the vehicle with the operator control section situated between said boom supporting means and the rear end of said vehicle, a boom assembly including a pair of support arms pivotally mounted in spaced coextensive relation on said boom supporting means for transverse swinging movement over the operator control section, said support arms terminating in free end portions outwardly of the one end of the vehicle, an end frame pivotally interconnecting said free end portions in spaced parallel relation, an implement pivotally mounted on said end frame for vertical swinging movement about said free end portions, side travel control means operatively connected to said boom assembly to effect lateral movement of said support arms with respect to the vehicle, and implement control means to selectively control vertical swinging movement of the implement with respect to the said boom assembly and the vehicle.

5. In apparatus for supporting and positioning an implement on a vehicle, a boom assembly comprising a fixed supporting frame on said vehicle, a horizontally extending boom member pivotally mounted on said supporting frame for lateral swinging movement in spaced relation over said vehicle, said boom member terminating in a free end portion at one end of the vehicle, and supporting means for mounting an implement at the free end of said boom member.

6. In apparatus according to claim 5, said boom member being in the form of a cantilever beam converging outwardly from a relatively wide pivotal end portion into a downwardly extending free end portion.

7. An apparatus according to claim 5, said supporting frame including upright boom supporting means disposed intermediately of the vehicle, and said boom member being formed of a pair of cantilever support arms interconnected in spaced parallel relation and being pivotally mounted on said boom supporting means.

8. A mobile hammer unit comprising in combination with a vehicle, a fixed mounting frame, a pair of coextensive boom support arms pivotally mounted in spaced parallel relation on said mounting frame for conjoint lateral swinging movement over the vehicle, an end frame member pivotally interconnecting the free ends of said support arms, said end frame being so arranged in relation to said support arms as to remain squared to the line of travel of the vehicle when said support arms are pivoted with respect to said vehicle, and a hammer frame assembly carried by said end frame for independent vertical swinging movement about said boom support arms.

9. A mobile hammer unit comprising in combination with a vehicle having an operator control section at one end thereof, a fixed mounting frame on the vehicle, a pair of coextensive cantilever support arms pivotally mounted in spaced parallel relation on said mounting frame for conjoint, lateral swinging movement over the operator control section, an end frame member pivotally interconnecting the free ends of said support arms, said end frame pivotally interconnecting said support arms in spaced parallel relation so as to remain squared to the line of travel of the vehicle when said support arms are pivoted with respect to said vehicle, and a hammer frame assembly pivotally carried by said end frame for independent vertical swinging movement about said cantilever support arms.

10. Piston control apparatus for a mobile hammer comprising, in combination, a fixed mounting frame adapted to be mounted on a vehicle, a boom assembly, a bearing support pivotally supporting one end of said boom assembly on said frame for transverse movement with respect to the vehicle, an end frame at the end of said boom assembly opposite the pivotal end, said end frame including a cylindrical bearing mount journaled for vertical swinging movement about a horizontal axis adjacent to the upper end of said end frame, and a hammer guide frame assembly having a spindle journaled for rotation within said bearing mount to provide for tilting of said hammer frame assembly independently of lateral swinging movement of said boom assembly and vertical swinging movement of said bearing mount about said end frame.

11. Position control apparatus for a mobile hammer comprising in combination a fixed supporting frame adapted to be mounted on a vehicle, a boom assembly having a pair of cantilever support arms, means pivotally supporting said cantilever support on said frame for lateral swinging movement with respect to the vehicle, an end frame pivotally interconnecting the free ends of said cantilever support arms, said end frame remaining squared to the line of travel of said vehicle under lateral swinging movement of said support arms, a hammer frame assembly, means mounting said hammer frame assembly on said end frame for independent vertical swinging movement and tiltiing movement about two spaced perpendicular axes, said hammer frame assembly having spaced vertical guideways in facing relation to one another, and a hammer mounted for reciprocal sliding movement along said guideways.

12. Position control apparatus for a mobile hammer comprising in combination a fixed supporting frame adapted to be mounted on a vehicle, an elongated boom assembly including a pair of coextensive arms, means pivotally supporting one end of said boom assembly on said frame for lateral swinging movement across one end of the vehicle, an end frame pivotally interconnecting the free ends of said arms in spaced parallel relation, a cradle mounted for pivotal swinging movement about a horizontal axis at the upper end of said end frame, said cradle including a cylindrical bearing mount, a hammer guide frame assembly having a cylindrical support member journaled for rotation within said bearing mount on said cradle to provide for tilting of said hammer guide frame assembly with respect to the vehicle, said guide frame assembly having spaced vertical guideways, a tower having side track members slidable along said guideways, and a hammer having opposite sides slidable on said side track members, power means for reciprocating said hammer with respect to said tower, and lift control means associated with said tower for raising and lowering said tower and said hammer simultaneously along said guideways.

13. A power operated hammer comprising in combination with a vehicle having a drive mechanism and chassis, a boom assembly pivotally mounted on the chassis for lateral swinging movement across one end of the vehicle, an outer hammer guide frame assembly pivotally connected to said boom assembly for relative swinging movement, said guide frame assembly including a main support frame having vertical guideways along opposite sides thereof, a tower having elongated side track members disposed for slidable movement along said guideways and an upper cross brace between said track members, and height adjustment means for raising and lowering said tower along said guideways, a hammer disposed for slidable movement along said side track member having an impact tool suspended from the lower end thereof, and power operated means between the cross brace on said tower and said hammer for reciprocating said hammer and impact tool along said side track members.

14. A power operated hammer according to claim 13, said hammer being of hollow heavy-walled configuration with an opening at its upper end, and said power operated means extending downwardly through the opening in said hammer for connection to the lower interior end of said hammer.

15. In a power operated hammer, a hammer guide frame assembly comprising in combination a main support frame, divergent sides terminating in V-shaped vertical guideways disposed in facing relation to one another, a tower having elongated spaced vertical track members being generally rectangular in cross section and being disposed for slidable movement along said guideways, lift control means to provide for height adjustment of said tower along said guideways, a hollow hammer having opposite sides disposed for slidable movement along said side track members, said hammer having an impact tool suspended from the lower end thereof, and a double-acting power cylinder extending downwardly from said tower through said hammer for pivotal connection to the lower end of said hammer to effect reciprocal sliding movement of said hammer along said side track members.

16. In a power operated hammer unit, a hammer guide frame assembly including spaced vertical guide members, a hammer head having an elongated body portion with an axial opening therein and with opposite sides disposed for slidably movement along said guide members, and fluid actuated power means extending downwardly from said guide frame assembly through the axial opening in said body for connection to the lower end of said hammer head whereby to control sliding movement of said hammer head along said guide members.

17. In a power operated hammer unit according to claim 16, the body of said hammer head being further characterized by being of hollow heavy-walled configuration to define the axial opening for downward extension of said power operated means through said hammer head.

18. In a power operated hammer unit according to claim 16, the body portion of said hammer head having a hollow extension of reduced size at the lower end thereof, an impact tool suspended from the lower end of said extension, and said power operated means being defined by a double acting power cylinder including a cylinder rod extending downwardly through said extension for pivotal connection to the lower end of said extension.

19. In a mobile hammer unit mounted on a vehicle having a chassis, a drive mechanism and brake assembly, the combination therewith of a boom assembly on said chassis terminating in an outer free supporting end portion outwardly of the one end of said chassis, a hammer frame assembly being movably mounted on said boom assembly, position control means for said hammer unit including first position control means for controlling movement of said boom assembly and hammer frame assembly with respect to the vehicle and second position control means for controlling movement of said hammer frame assembly independently of said boom assembly, and reduction gear drive means being operable independently of the vehicle drive mechanism to selectively drive the vehicle at a reduced rate of speed, said reduction gear drive means including brake control means being automatically energized when said reduction gear drive means is not driving the vehicle to brake the vehicle against movement.

20. In a mobile hammer mounted on a vehicle having a chassis, a drive mechanism including a drive shaft and reduction gear on the shaft together with a brake assembly and an operator control section at one end of the vehicle, the combination therewith of an overhead boom assembly pivotally supported on said chassis for lateral swinging movement over said operator control section, said boom assembly terminating in an outer free supporting end portion outwardly of the one end of said chassis, a pivot mount carried at the free end of said boom assembly for vertical swinging relative to said boom assembly, and a hammer frame assembly being connected in swiveled relation to said pivot mount for tilting movement of said frame assembly about an axis transverse to the axis of connection between said pivot mount and said boom assembly; position control means for said hammer including side travel control means between said chassis and said boom assembly for controlling lateral swinging movement of said boom assembly, pivot mount and hammer frame assembly, layback control means between said pivot mount and said boom assembly for controlling vertical swinging movement of said pivot mount and hammer frame assembly independently of said boom assembly, and tilting control means between said pivot mount and said hammer frame assembly for controlling tilting movement of said hammer frame assembly relative to said pivot mount and said boom assembly; and a reduction gear drive being operable independently of said vehicle drive mechanism to selectively drive said vehicle through the reduction gear and drive shaft therefor, and said reduction gear drive including brake control means being automatically energized when said reduction gear drive is not driving the vehicle to brake said vehicle against movement.

21. In a position control apparatus for a vehicle having a brake assembly and a drive mechanism for propelling the vehicle including a drive shaft and reduction gear splined to the shaft, the combination therewith of a creeper drive motor having a drive gear disposed for intermeshing engagement with said drive gear, means for energizing said creeper drive motor to drive the vehicle through said drive and reduction gears, and brake control means operatively connected to the brake assembly including means energized in response to de-energization of said creeper drive motor to automatically brake the vehicle against movement.

22. In position control apparatus for a vehicle having a drive mechanism for propelling the vehicle, the drive mechanism including a drive shaft and reduction gear splined to the shaft, the combination therewith of a reduction drive motor having a drive gear arranged in spaced parallel relation to the drive shaft, means for shifting the reduction gear into intermeshing engagement with said drive gear, means for energizing said reduction drive motor to drive the vehicle at a reduced rate of speed through said drive and reduction gears, and braking means for the vehicle including brake control means responsive to shifting of said reduction gear to actuate said braking means whereby to automatically brake the vehicle against movement whenever said reduction drive motor is not energized and to release said braking means whenever said creeper drive motor is energized.

23. In a position control apparatus for a vehicle having a brake assembly and a drive mechanism for propelling the vehicle with said drive mechanism having a drive shaft and a reduction gear on the drive shaft, the combination therewith of a hydraulic control circuit, a hydraulically-actuated reduction drive motor having a pinion mounted in spaced parallel relation to the drive shaft, a hydraulic brake cylinder operatively connected to the brake assembly to effect braking and release of the vehicle, control valve means in the control circuit for operating said brake cylinder in correlated relation with said reduction drive motor to release the brake assembly whenever said drive motor is actuated and to brake the brake assembly whenever said drive motor is not actuated, and means for selectively interengaging the reduction gear and said pinion to drive the vehicle through the reduction gear in response to actuation of said reduction drive motor.

24. In a position control apparatus for a vehicle having a brake assembly and a drive mechanism for propelling the vehicle including a drive shaft and speed reducing means keyed to the shaft, the combination therewith of a creeper drive mechanism for propelling the vehicle at a reduced speed comprising a hydraulic drive motor having a pinion arranged in spaced relation to the drive shaft, a drive motor control circuit including a control valve selectively movable between a neutral position and a drive position for operating said drive motor, and creeper drive control means for advancing the speed reducing means into intermeshing engagement with said pinion whereby to drive the vehicle from said pinion and speed reducing means in response to operation of said drive motor.

25. In a position control apparatus according to claim 24 wherein the vehicle includes a hydraulically actuated steering circuit, and said hydraulic control circuit including a source of fluid under pressure and a flow divider for proportioning flow of fluid from said source to said motor control valve and to said steering circuit.

26. In a position control apparatus for a vehicle having a brake assembly and a drive mechanism for propelling the vehicle including a drive shaft and a reduction gear splined to the shaft, the combination therewith of a creeper drive mechanism for driving the vehicle at a reduced speed comprising a reversible hydraulic drive motor having a pinion arranged in spaced parallel relation to the drive shaft, a hydraulic control circuit including a motor control valve selectively movable between a neutral position and a drive position for actuating said drive motor, a hydraulic brake control cylinder operatively connected to the brake asembly, a hydraulic brake control circuit for operating said cylinder including a first control valve to control the supply of fluid under pressure to said brake control circuit and a second control valve for actuating said brake control cylinder in correlated relation with said motor control valve whereby to actuate said brake control cylinder only when said motor control valve is in its neutral position, and gear shift control means for shifting said reduction gear into intermeshing engagement with said pinion and simultaneously opening the main control valve for said brake control circuit.

References Cited

UNITED STATES PATENTS

| 912,962 | 2/1909 | Hoy | 308—3 |
|---|---|---|---|
| 2,524,589 | 10/1950 | Becker | 173—126 |
| 2,844,006 | 7/1958 | Lutz et al. | 173—27 |
| 3,058,562 | 10/1962 | Andrus | 192—106 |
| 3,088,385 | 5/1963 | Dorkins et al. | 173—27 |
| 3,088,531 | 5/1963 | Garrett et al. | 173—27 |
| 3,117,635 | 1/1964 | Deerkoski | 173—127 |
| 3,195,656 | 7/1965 | Johnson et al. | 173—38 |
| 3,225,842 | 12/1965 | Roeschen | 173—43 |

FRED C. MATTERN, JR., *Primary Examiner.*

L. P. KESSLER, *Assistant Examiner.*